United States Patent [19]

Dwyer

[11] Patent Number: 4,829,339
[45] Date of Patent: May 9, 1989

[54] FILM PRINTING/READING SYSTEM

[75] Inventor: Eugene J. Dwyer, Morristown, N.J.

[73] Assignee: Silhouette Technology, Inc., Morristown, N.J.

[21] Appl. No.: 54,294

[22] Filed: May 26, 1987

[51] Int. Cl.$^4$ .................. G03B 27/72; G03B 27/80
[52] U.S. Cl. ........................ 355/20; 355/81; 358/51
[58] Field of Search .................. 355/20, 81; 358/51

[56] References Cited

U.S. PATENT DOCUMENTS

| | | |
|---|---|---|
| 2,985,064 | 5/1961 | Dimmick . |
| 3,027,219 | 3/1962 | Bradley ........................ 346/110 |
| 3,115,807 | 12/1963 | Craig et al. .................... 355/20 |
| 3,145,368 | 8/1964 | Hoover, Jr. .................... 340/173 |
| 3,183,766 | 5/1965 | Takasaka et al. ............... 355/20 |
| 3,191,157 | 6/1965 | Parker et al. ................... 340/173 |
| 3,404,220 | 10/1968 | Favreau ........................ 358/51 |
| 3,508,245 | 4/1970 | Purdy et al. ................... 340/324 |
| 3,703,135 | 11/1972 | Lang . |
| 3,721,965 | 3/1975 | Morgan-Voyce ................ 340/174 |
| 3,809,888 | 5/1974 | Stock et al. ................... 250/213 R |
| 3,819,854 | 6/1974 | Kolb ............................ 178/6.7 R |
| 3,852,782 | 12/1974 | Gundlach et al. ............... 354/110 |
| 3,866,199 | 2/1975 | Eberhard et al. ............... 340/267 |
| 3,885,096 | 5/1975 | Inuiya .......................... 178/15 |
| 3,898,005 | 8/1975 | Roberts ........................ 355/54 |
| 4,084,894 | 4/1978 | Yoshino ........................ 353/34 |
| 4,088,401 | 5/1978 | Rees et al. .................... 353/122 |
| 4,115,002 | 9/1978 | Clark ........................... 355/54 |
| 4,141,642 | 2/1979 | Nagai et al. ................... 355/1 |
| 4,240,729 | 12/1980 | Barney ......................... 354/76 |
| 4,265,532 | 5/1981 | McIntosh ...................... 355/20 |
| 4,319,281 | 3/1982 | Gall et al. ..................... 358/244 |
| 4,371,259 | 2/1983 | Howitt ......................... 355/38 |
| 4,433,345 | 2/1984 | Haddick et al. ................ 358/244 |
| 4,457,618 | 7/1984 | Plummer ....................... 355/20 |
| 4,457,626 | 7/1984 | Idesawa et al. ................ 356/376 |
| 4,473,294 | 9/1984 | Iimori ......................... 355/68 |
| 4,588,287 | 5/1986 | Spinelli ........................ 355/46 |
| 4,630,115 | 12/1986 | Hilsum ......................... 358/139 |
| 4,666,307 | 5/1987 | Matsumoto et al. ............ 355/38 |
| 4,719,488 | 1/1988 | Setani et al. .................. 355/46 |

FOREIGN PATENT DOCUMENTS

| | | | |
|---|---|---|---|
| 54-37429 | 3/1979 | Japan .......................... | 358/51 |
| 1222022 | 2/1971 | United Kingdom ............. | 358/51 |

Primary Examiner—Monroe H. Hayes
Attorney, Agent, or Firm—Antonelli, Terry & Wands

[57] ABSTRACT

A photographic system for accurately reproducing encoded information onto a recording medium is disclosed. The system includes an image/light source, a feedback sensor, a lens assembly, a controller, a recording medium assembly and a reading sensor, whereby encoded information is decomposed into sections, adjusted, and transmitted such that the sections are correctly aligned and smoothly joined into a final reproduced image. According to the present invention, encoded information can also be digitized and read.

43 Claims, 7 Drawing Sheets

FILM PRINTING/READING SYSTEM

BACKGROUND OF THE INVENTION

This invention relates to a method of, and a photographic system for, exposing a recording medium to a light image. More specifically, the invention relates to a system which prints computer generated, or computer stored images or information onto light sensitive film or material while maintaining a high resolution and geometric accuracy in the printed image. The system also provides the capability to read or digitize film-based imagery or information with the same high resolution and geometric accuracy.

In general, most commercial film printers consist of a cathode ray tube (CRT), a lens, a film holder, and related drive/control electronics. An image displayed or drawn on the CRT faceplate is projected by the lens onto the film surface, and is thereby printed. Color images are frequently printed by decomposing the original image into three primary color frames and sequentially printing each frame through an appropriate color filter onto a single piece of recording media.

Other image characteristics, such as shading information, may be incorporated into the final printed image. U.S. Pat. No. 3,852,782, issued Dec. 3, 1974 to Gundlach et al., describes an imaging system wherein the light in contiguous sections of an image is differentially attenuated and focused through a select one of adjacent lenticules onto contiguous segments of a photoreceptor. This provides for the recording of highlights, medium tones, or shadows in the image produced on the photoreceptor.

It has been another object in the art to provide for the recordation of multiple images. U.S. Pat. No. 4,115,002, issued Sept. 19, 1978 to Clark, discloses a device whereby separate total images are selectively overlapped for integrating these individual images into a resulting final copy having a high information ratio. The images are projected onto the film plane through various lenses positioned in a predetermined manner. Provision is also made for color and density correction filters for altering the color balance and density, respectively, of the original images.

U.S. Pat. No. 3,703,135, issued Nov. 21, 1972 to Lang, also describes a multiple image film exposure and projection system. This system successively exposes small areas of a film frame through a shuttered lens array, thereby providing a plurality of individual images on the frame without the need to move either the camera or the frame.

A method of obtaining a double image of a single object is disclosed in U.S. Pat. No. 4,088,401, issued May 9, 1978 to Rees et al. In this method, multiple projection lenses with shutters are also used to achieve the double imaging.

The image on a CRT faceplate is created by deflecting and modulating an electron beam within the CRT vacuum envelope. As the electron beam strikes the inner wall of the CRT faceplate, a layer of phosphor converts the electron beam energy to light. The resolution of the CRT image depends on the electron beam spot size and shape, the grain size of the CRT phosphor, and the degree to which the beam deflection system can accurately and reproducibly address an absolute position on the CRT face. The geometric accuracy of the CRT image, while not specifically dependent on the CRT resolution, can equally affect the resolution and accuracy of the printed image, as can distortions introduced by the projected lens. The higher the resolution and geometric accuracy of the CRT image source, the more detailed and accurate will be the final printed image.

A major drawback in obtaining high resolution and accuracy in prior art film printers has been cost. In general, there is rarely an exactly known and fixed relationship between deflection system commands and resulting CRT beam position. Although this relationship may at some point in time be measured or calibrated, the varying of environmental factors such as temperature and magnetic field strength tend to reduce the long term accuracy and reliability of such information. Components and systems resistant to such changes are costly and imperfect. Consequently, the CRT image and resulting film print is usually only an approximation to the initial image data since the individual points of the image are never perfectly located.

Such considerations apply especially in the case of printing a color image. In order to insure correct registration of the three separate primary color frames, the film printer must maintain a high precision over the entire time required to print all three frames. Thermal drift of the beam deflection electronic parameters make such registration difficult.

One way to achieve a higher CRT display resolution is feedback, whereby inaccuracies are continually corrected. One such system, which utilizes a feedback arrangement to correct CRT display image distortions due to vibrations is disclosed in U.S. Pat. No. 4,630,115 issued Dec. 16, 1986 to Hilsum. In particular, this device directs light from a spot on the CRT screen onto a photocell which detects the position of the light spot. Feedback is then utilized to process the output of the photocell detector to provide a correction signal which is, in turn, utilized by the deflection system of the CRT to adjust the position of the electron beam and, hence, the light spot. This correction is applied to the image as a whole in order to reduce the net motion of the image. Individual points or pels within the image are not adjusted relative to one another, and the method does not enhance the accuracy or precision of the displayed image.

As discussed above, prior devices involve the use of single element photo-sensors. Moreover, where a photo-sensor is used to feed back CRT beam position information, the CRT beam must be moved to the periphery of the CRT surface in order to excite the sensor. The accuracy of the final, determined position of a light spot depends upon the precision of the photodetector system.

Deflection system calibration information derived from such beam position measurements becomes progressivly less accurate in regions away from the point of calibration. Deflection corrections which apply to beam positioning in the interior of the image must be extrapolated from these peripheral data and are consequently less accurate. The effective measuring range of a photosensitive element can be extended by enlarging the sensor area of the element. With this technique, however, it is increasingly difficult to ensure homogeneity over the entire enlarged sensor area. In addition, it becomes prohibitively expensive to provide further system components of sufficient precision.

U.S. Pat. No. 4,457,626 issued July 3, 1984 to Idesawa et al., describes an alternative type of device for more accurately determining positioning information. More specifically, this device includes a single lens in operative association with a mirrored cavity for reflecting a beam of light from a designated mark on an object onto a photosensitive element. The particular system used thereby, effectively enlarges the area of the photosensitive element. Idesawa et al.'s device uses a feedback algorithm which calculates positioning information based on the beam's detected position on the photosensitive element, the location of the object or spot source, and the number of reflections of the light beam within the mirrored cavity.

One disadvantage of this prior art device is the loss of intensity of the light beam incurred during reflection of the beam from the walls of the mirrored cavity. In addition, the walls of the mirrored cavity must be precisely parallel and flat to eliminate distortions which would otherwise occur. Also the size of the collection lens is limited to the physical size of the photosensitive element, because the mirrored walls must begin just at the edge of the photosensitive element and must encompass the collection lens.

A further disadvantage with prior art devices is that they can only correctly image surfaces of uniform curvature. Moreover, absolute position calibration, absent some knowledge of the history of a spot's motion, has heretofore not been easily achieved.

Thus, there exists in the art a genuine need for a film printing system which achieves a high precision and accuracy over the entire image area by the effective use of feedback for correct beam placement.

Furthermore, there exists a need for an inexpensive method of enhancing the effective area of existing photo-sensors without introducing distortions or limiting the available light.

Lastly, a need exists for the ability to precisely locate the CRT beam to provide for the accurate positioning and joining of adjacent image sections projected onto the recording film medium, thereby producing a single, high quality image that has a significantly higher resolution than the single CRT image source. Prior art does not disclose success in this process of merging image sections to reproduce a larger, original, single image.

SUMMARY OF THE INVENTION

The present invention provides a method and apparatus for recording an image onto a recording medium through the effective utilization of feedback on the position of a light spot to thereby accurately produce the image.

In particular, the method and apparatus use a printing lens assembly in order to increase and enhance the effective resolution of a CRT or other image source. By decomposing a single image into sections, and printing each of those sections through the appropriate element of the printing lens array in such a manner that the original image is reassembled on the recording medium, the effective area or resolution of the image source is increased. In addition, appropriate color filters are used in reproducing color images.

In joining the various image sections into a final smooth image, the method and apparatus depend upon a type of feedback, e.g., optical. Systematic errors in the placement of the various image sections can result in distortions or alternate light and dark lines in the final print. Beam position feedback is used to locate the individual image points such that the image sections align and merge correctly on the film. To reduce the chance of error, and to ease manufacturing requirements, the elements of the printing lens array are spaced such that each lens element can print over an area of the film larger than necessary. This produces an overlap of coverage in border regions of image sections, where the recorded image can accept light contributions from more than one lens of the printing lens array. In such regions, the contributions of light to each image element by each lens will be tailored so as to smoothly merge the adjacent image sections. Thus, the border regions are printed at a reduced intensity, and are therefore "feathered" together.

The feedback process involves the use of a large coverage or multiple element photo-sensor in conjunction with a lens or lens array to detect the position of a light spot on the image source. This information will then be used to determine whether the light-emitting spot is in its correct or desired position, and/or to determine what corrective measures are necessary to move the spot to the desired position. Corrections are applied by varying the extent of deflection of the CRT or image source electron beam, which, in turn, moves the light spot.

Although it is possible to use a single lens and single sensor in the feedback process, there are advantages in the use of a sensor lens array to image the CRT surface onto the sensor. By using a lens array, the effective area of coverage or resolution of the sensor is extended and enhanced. The use of a lens array also allows a great deal of flexibility not found in prior art photo-sensor systems. For example, the individual spacings of the lens elements may be arranged so as to provide coverage at specific critical regions of the CRT or image source surface, including overlap of coverage. Also, other parameters of the lens elements, such as the focal lengths or object distances, may be individually varied to accommodate curved or otherwise unusual surfaces or regions on which the light emitting mark is found.

In addition, the lens array could simply embody a single lens split or divided so as to cast multiple images. Finally, the increase in effective coverage or resolution which accrues from the use of a multi-lens array in front of a photo-sensor has general utility in applications not directly related to film printing. In one specific application, the multi-lens arrangement can be used to align or register the separate images of a projection television system.

The method and apparatus of the present invention can read as well as print film-based images or information. Film can be read by using the CRT as a light source and measuring the amount of light transmitted through the film by some type of photo-sensor, e.g., photo-diode or photo-multiplier tube. A second sensor measures the incident light intensity on the film. Again, the enhanced feedback sensor and printing lens array are used in the reading process and provide enhancements to the system.

BRIEF DESCRIPTION OF THE DRAWINGS

A better understanding will be had by referring to the accompanying drawings, in which.

DETAILED DESCRIPTION

Figure 1:
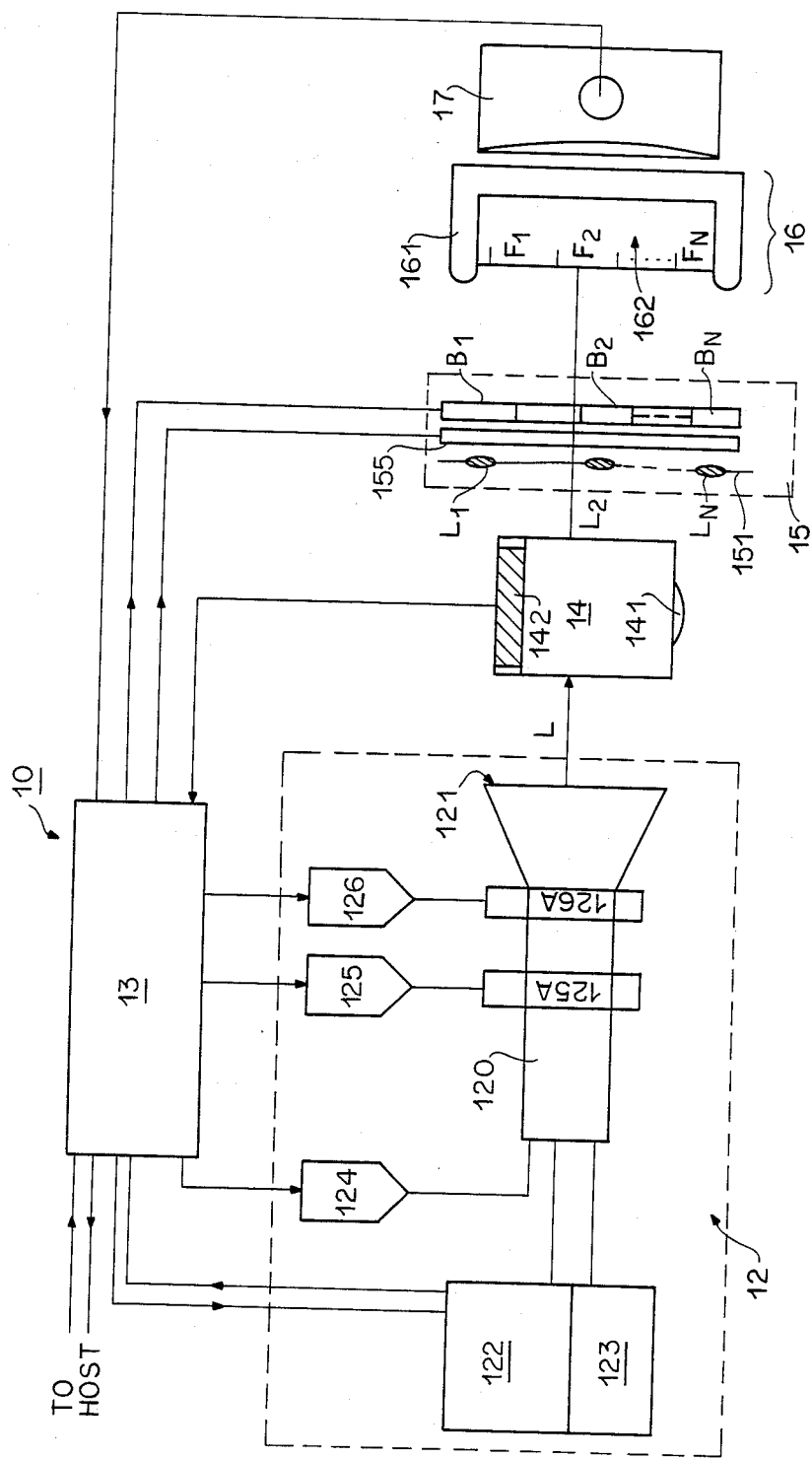
FIG. 1 is a block diagram of the system apparatus according to the present invention.

Referring now to the drawings and, more particularly, to FIG. 1, a film printing/reading system designated by the reference numeral 10, is illustrated. The system 10 generally comprises an image/light source 12, controller 13, feedback sensor 14, lens assembly 15, film plane assembly 16, and reading sensor 17.

In a preferred embodiment, image/light source 12 generally consists of a cathode ray tube (CRT) 120. CRT 120 provides for the illumination of encoded information such as an image on the CRT faceplate 121. Image/light source 12 also contains CRT power supplies, e.g., anode and focus power supplies 122 and heater and control grid (G1, G2) power supplies 123, as well as video amplifier 124, all of which serve to produce an image on the CRT faceplate. More specifically, the image on the CRT faceplate is created in a way similar to that used in displaying commercial television images, viz., by deflecting and modulating an electron beam within the CRT vacuum envelope. Accordingly, X deflection amplifier 125 and Y deflection amplifier 126 are controllable deflection assemblies such as digital to analog converters followed by power amplifiers which are used in conjunction with X deflection yoke 125A and Y deflection yoke 126A, respectively, to deflect the electron beam.

In reproducing an image, all points of the CRT faceplate are mapped onto film plane assembly 16 through lens assembly 15. In order to increase the number of pels or lines which may be printed by a CRT 120 of fixed resolution, an image is divided into sections and printed by section onto film plane assembly 16. Film plane assembly 16 consists of a film holder 161 which contains a recording medium 162, such as film, upon which an image is projected.

Lens assembly 15 consists of a printing lens array 151 containing a matrix of lens elements L1 through LN. Printing lens array 151 can be wide area (NXM) or one dimensional (1XN) depending upon the particular application desired. Each lens element L1-IN has an associated shutter B1-BN which is utilized when transmitting an image. For example, each shutter B1-BN is opened for the time needed to print one image section, which is displayed on the CRT at the time. The full image is then printed by sequentially displaying each image section on the CRT, opening the appropriate shutter B1-BN, thus exposing the correct lens element L1-IN and projecting that section of the image onto the correct region of the recording medium 162.

It should be recognized that applications involving both monochromatic (black and white) and polychromatic (multiple individual colors) images are encompassed within the scope of the present invention. In the case of the latter embodiment, a color filter 155 is positioned proximate to the printing lens array 151 such that light passing through lens elements L1-LN also passes through filter 155 and, thus, assumes the appropriate color value before being projected onto the film plane assembly 16. Generally, such color filters are mounted on a wheel or ring referred to as a "filter wheel".

The film plane assembly 16, and more particularly, the recording medium 162, is separated by the geometry of lens array 151 into its own theoretical matrix of tangential square regions F1-FN. Lens elements L1-LN are constructed and positioned such that each lens—shutter element (LN/BN) can project an image section of the CRT faceplate that more than covers the associated element FN of the theoretical matrix of recording medium 162.

In order to accurately reproduce an image, therefore, each section of the final image must be printed without the effects of gaps or overlaps associated with adjacent sections. To accomplish this result, the system 10 utilizes feedback sensor 14 and controller 13.

Figure 2:
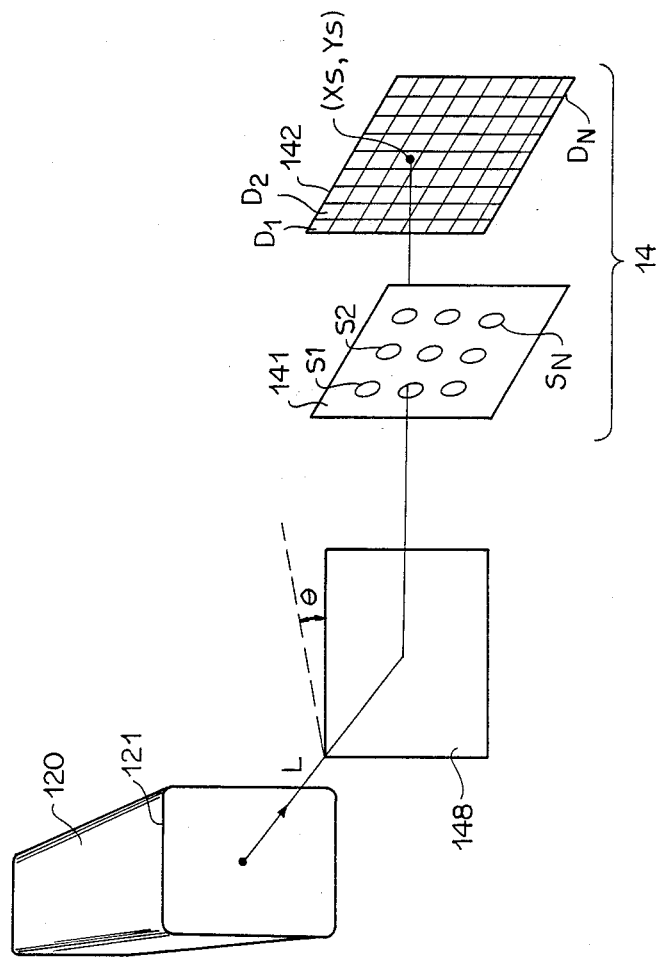
FIG. 2 illustrates one embodiment of the feedback sensor portion of the photographic system of the present invention.

As shown in FIG. 2, in a preferred embodiment, feedback sensor 14 includes sensor lens array 141 containing a matrix of lens elements S1-SN and a photo-sensitive element 142. A light beam L which is projected from an image on the CRT faceplate 121 is directed by half-silvered mirror 148 through sensor lens array 141. The partially reflecting mirror 148 is placed at a forty-five degree angle with respect to the plane of the CRT faceplate 121, and serves to direct the image from the CRT onto sensor lens array 141. Of course, it would also be possible to position CRT 120 such that light would reach photo-sensitive element 142 directly.

Light beam L passes through sensor lens array 141 and falls onto photo-sensitive element 142. Element 142 consists of a wide area array of adjacent photo-sensitive elements such as a charge coupled device (CCD) array, a photo-diode array, a charge injection device (CID), or some similar array of closely packed elements. As shown in FIG. 2, photo-sensitive element 142 consists of an array of photo-diodes D1-DN. As light beam L is projected onto the sensor area of element 142, one or more of the photo-diodes D1-DN is activated. Light beam L falls onto photo-sensitive element 142 at a particular sensed position having coordinates (XS, YS).

As shown in FIG. 1, the sensed position (XS, YS) is then fed back to controller 13. The (XS, YS) coordinates are then converted by reference to a pre-established algorithm or mapping, to film coordinates (XF, YF) and compared to a desired print position (X, Y). Controller 13 adjusts light/image source 12 accordingly, and the appropriate image point is then accurately printed onto recording medium 162, and the process is repeated until the entire image section is constructed on the recording medium.

In an alternative embodiment of the present invention, feedback sensor 14 is placed inbetween lens assembly 15 and film plane assembly 16. The sensor would then receive light reflected from the surface of the film plane. This particular arrangement is useful in situations where it would be advantageous to gather light from the film plane rather than the CRT for feedback purposes.

Figure 3:
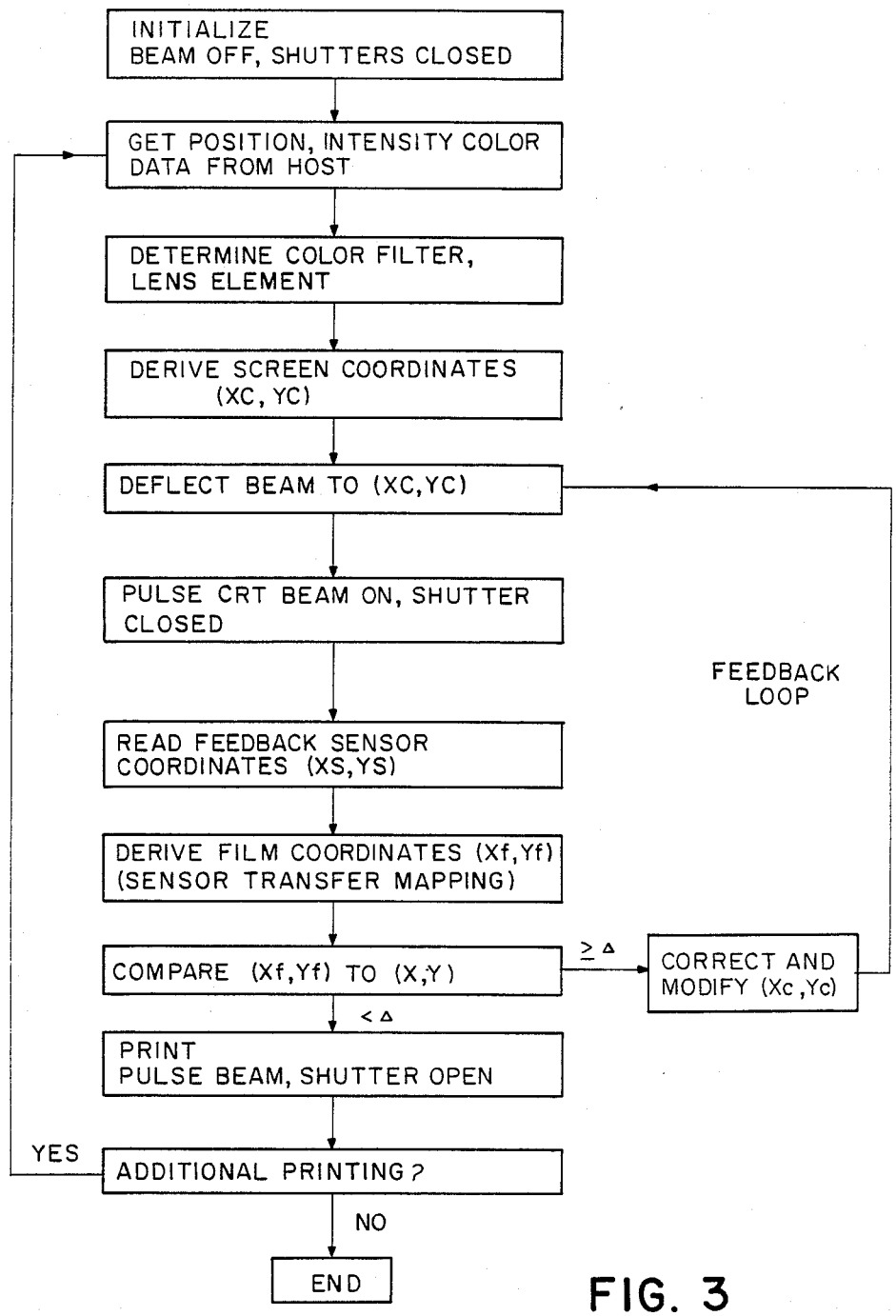
FIG. 3 is a flow chart of the steps involved in the printing process of the present invention.

The flow chart of FIG. 3 delineates the steps involved in the printing process of the present invention and more specifically, the printing of a single pel or point onto film. Generally by printing a sequence of pels, a number of steps could be eliminated, thereby increasing the efficiency of the system. This reduction of steps is possible in regions where there is no need to resort to feedback at each image point. Such regions are identified as collections of closely lying image points which suffer substantially the same aberrations or displacements. A single measurement of these aberrations or displacements using the feedback sensor system will therefore yield correction parameters which apply to all points within the region.

At first, the CRT beam is turned off and the shutters of the printing lens array are closed. Any necessary initialization procedures are performed, including the obtaining from the host computer, parameter specifications such as film sensitivity, speed data, image and picture sizes, and color correction codes. The controller then obtains data on the position (x, y), color C, and intensity Z of the next point to be printed. The (x, y) coordinates represent points on a hypothetical Cartesian coordinate system on the film. A predetermined maximum value and scale for this coordinate system are entered during the initialization process.

Using the (x, y) value, the controller determines in which segment of the film plane the point lies, and accordingly sets an internal status bit to indicate which lens element IN of the printing lens array should be unshuttered when actual printing is done. The controller further positions the appropriate color filter in front of the selected lens element based upon the prior obtained color data C.

The printer system next derives the CRT screen point coordinates. More specifically, using a CRT mapping algorithm, the system estimates the point (xc, yc) on the CRT faceplate which corresponds to the desired point (x, y) on the film plane. The CRT mapping algorithm relates coordinates on the film plane to positions on the CRT faceplate such that a light beam emitted from a point (xc, yc) on the CRT faceplate is projected onto the film plane at point (x, y). This relation is then translated into command information for the deflection assembly. This algorithm may rely either on mathematical calculations or on a look-up table, using pre-determined, pre-calibrated parameters.

The command information is sent to digital to analog converters which drive the CRT beam deflection electronics. Controller 13 instructs the deflection electronics to move the CRT beam to a point on the CRT faceplate which would roughly place the projected point at the desired location on the recording medium. The controller 13 relies o the inherent linearity of standard deflection systems to perform this task accurately. In general, within a particular image section, beam deflection instructions or data will be proportional to the (X, Y) coordinates of the image element position, but include an offset which depends on which section is being printed (or read). This correspondence constitutes an unstated calibrated algorithm or mapping. The point of the CRT face to which the beam is deflected (although it might then be turned off) is indicated by the coordinates (XC, YC).

The deflection amplifiers may be either electromagnetic or electrostatic type deflection units. With the shutters remaining closed, the CRT light beam is pulsed on for a predetermined period of time. During this time, the light beam is directed to the feedback sensor such that the beam falls upon the photo-sensitive element at a point (xs, ys).

Next the controller interrogates the feedback sensor to obtain the coordinates (xs, ys). The sensor position values (xs, ys) are then converted into film coordinates (xf, yf) using a sensor transfer mapping algorithm. This algorithm may also depend upon mathematical calculations, table look-up, or both. The mapping data utilized in the algorithm are based upon the geometrical relationships among the plane of the sensor, the CRT faceplate, the printing lens array, and the film plane. These geometrical relationships are quantified and encoded during manufacture, and accompany the film printing system throughout its use. The mapping may also obtained by using the unit's film reading capability. In this case, a special film image, accompanied by descriptive information, is read or digitized by the film printer system. Comparing the digitized information to the description associated with the calibrated image yields a transfer map or algorithm.

Using the value (xs, ys) and the particular lens element LN of the printing lens array, the system calculates a position (xf, yf) which corresponds to the point on the film where the light spot from the CRT would be projected if the shutter BN of the N'th element LN of the printing lens array were opened.

The desired film printing position (x, y) is then compared to the point (xf, yf). If the difference between these two positions is less than a predetermined criterion or threshold, $\Delta$, the light beam is considered to be correctly aimed, and the printing of the point by opening the appropriate shutter/lens elements (BN/LN) and pulsing the light beam therethrough onto the film is achieved. The beam is pulsed on for a time T at a beam current I. The resulting film exposure as determined by the product $T*I*V$, where V is the CRT beam or anode voltage and is often a constant value, is proportional to the desired intensity Z originally stored in the host.

Printing the correct intensity on the recording medium involves using controller 13 to command the CRT to emit a certain intensity of light at the appropriate location for an appropriate time T and current I. The intensity of light emitted from the CRT in response to specific commands from controller 13 is calibrated periodically. The feedback sensor, used to measure the CRT beam position, can also be used to sample the CRT beam spot intensity. Since an image of the spot normally appears somewhere on the sensor element, and since most photo-sensors respond proportionally to light intensity, such a measurement is possible. These data will be used to insure correct film printing intensity.

If, however, the difference in position values is greater than the threshold, the position of the CRT light beam must be adjusted accordingly. Once the appropriate adjustments to the position of the beam have been made via the controller and the deflection electronics, the point is then printed as described above.

The printing process is then repeated until all desired points have been printed. The film may also be printed in a "modest" mode whereby the appropriate correction parameters are evaluated over small regions of the CRT rather than on a point by point basis. In this case, it is assumed that the image points lie sufficiently close to each other, or are so uniformly affected by aberrations in the deflection and lens systems, that one set of correction data applies to all points within the region. This correction data, when applied to the beam deflection system, serves to properly and accurately locate each of said image elements on the recording medium. An advantage of printing in a burst mode would be a reduction in printing time.

Also, in some areas of the image, the deflection system might be inaccurate in a way that could be corrected by slightly changing the deflection system's command data in a systematic fashion. In other words, if there is some uniform way in which the deflection system is deficient or inaccurate, this inaccuracy can be measured to derive a correction, and apply it to all points within the limited area of the image. This would allow a precise location of the CRT beam without resorting to the feedback system at each point. The particular way in which the deflection command data would be corrected or modified would be found by comparing (X, Y) values to (XF, YF) values for a number of separate image points within the area of interest. This comparison would lead to a simple set of correction data, or correction algorithm (such as "subtract a constant value from each X") which would be used to modify the deflection system command data. This is essentially a higher level use of the feedback loop data, in that several feedback measurements are integrated into a local correction table/algorithm for the deflection system.

Figure 4:
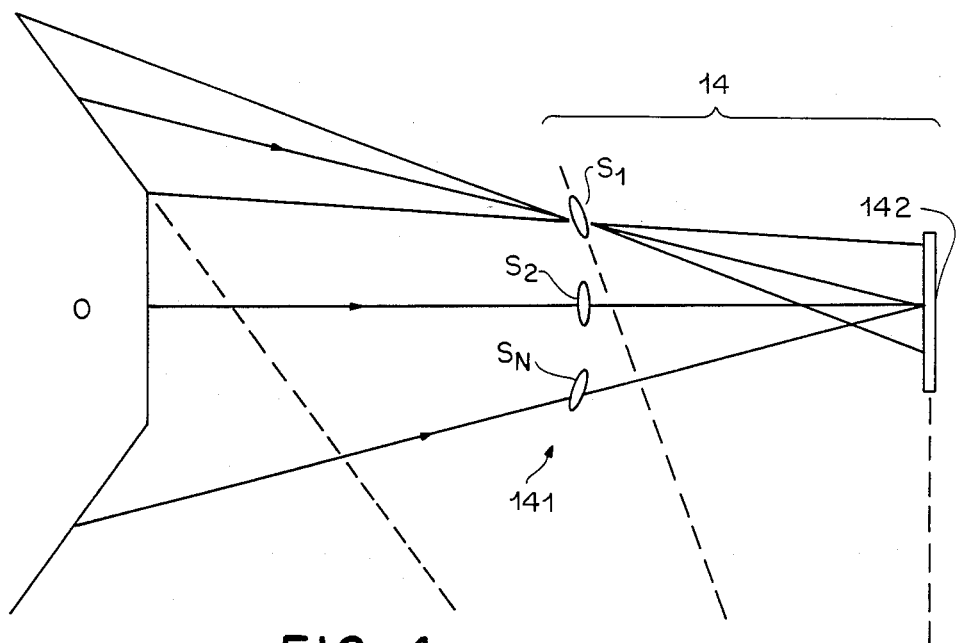
FIG. 4 illustrates an alternative embodiment of the feedback sensor portion of the photographic system of the present invention, which accounts for non-flat emitters.

Although the feedback sensor will work with a single lens in place of sensor lens array 141 and a single photosensor as element 142, there are advantages, e.g., cost benefits, in artificially enhancing the effective area of the photo-sensitive element by using a lens array. More specifically, as shown in FIG. 4, the net effect of sensor array 141 is to extend the effective area of coverage of the sensor, thereby enhancing the resolution of the sensor. The use of a lens array also permits a flexibility not found in prior systems. In particular, the individual spacings of the sensor lens array elements S1-SN may be arranged so as to provide coverage at specific critical regions of the image source (shown in this figure as object O), including an overlap of coverage. Additional parameters of sensor lens elements S1-SN, such as focal lengths or object distances, may be individually varied to accommodate unusual, e.g., curved, surfaces or regions on object O upon which a light emitting mark is found.

Figure 5:
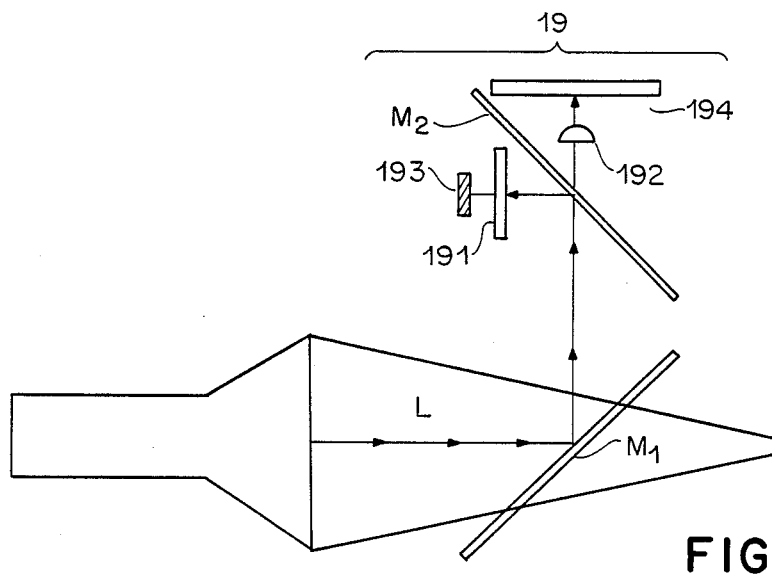
FIG. 5 illustrates an alternative embodiment of the feedback sensor which utilizes charge coupled devices as photo-sensitive elements.

An alternative embodiment and arrangement of the feedback sensor is shown in FIG. 5. In this embodiment, feedback sensor 19 includes cylindrical lenses 191 and 192. Two linear charge coupled devices 193 and 194 are placed at right angles with respect to each other, and serve to locate the CRT light beam L in both X and Y directions. Sensor devices 193 and 194 may consist of linear arrays of, e.g., approximately 2000 by 1 elements. To accommodate both sensor devices 193 and 194, light beam L must be split twice--which is accomplished by directing the light beam through partially reflecting mirrors M1 and M2. In this embodiment, the sensor devices may not be randomly read if the devices are constructed for serial output, where individual sensor elements must be read in sequence. Consequently, the individual elements must be read in sequence until the illuminated element is found. Thus, although the feedback process is somewhat slowed by this arrangement, the advantages of high resolution and good sensitivity to light are obtained. Of course, the second mirror can be eliminated by using a wide area CCD array as sensor device 194 and substituting a single lens array for lenses 191 and 192.

The use of the feedback sensor within the present system provides for the accurate reproduction of an image by smoothly joining adjacent image sections. This image joining procedure is based primarily on the high positional accuracy of the photographic system. To obtain maximum accuracy, the additional technique of "feathering" the edges of adjacent image sections is used.

Figure 6:
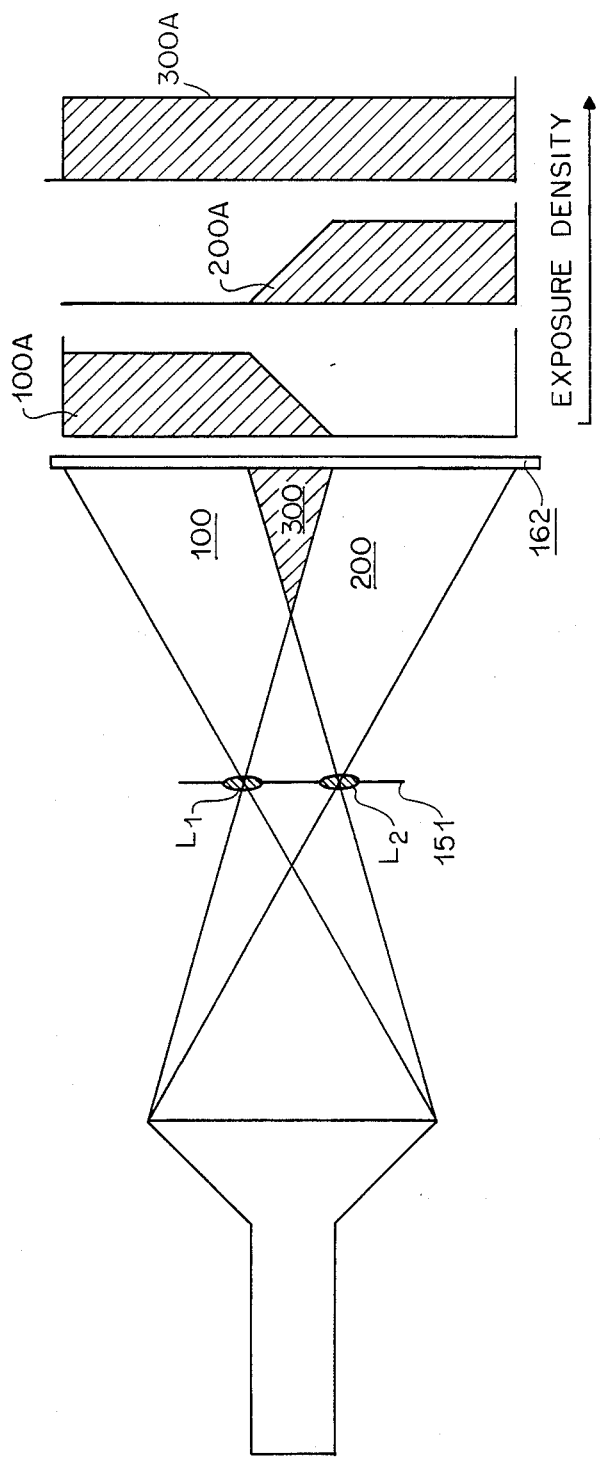
FIG. 6 illustrates the feathering process according to the present invention.

This feathering of edges is shown in more detail in FIG. 6. In this instance, the lens elements L1-IN of printing lens array 151 are positioned so that there is an overlap of coverage on the film plane 162. As shown in FIG. 6, Region 300 is the overlap in print coverage of lens elements L1 and L2. Thus, the areas where image sections are to be joined will be accessible by at least two lens elements, and further accessible by up to four lens elements at the corners.

Each edge is printed with decreasing intensity as a border is approached and crossed. The graph of Exposure Density shows the result of this feathering process. More specifically, full film exposure is achieved by feathered contributions from two or more lens elements. Region 100A shows the print intensity through lens element L1; region 200A shows the print intensity through lens element L2; and region 300A shows the sum of exposure from both lenses L1 and L2. This technique serves to reduce the visual effect of any small errors in joining adjacent image sections, and results in an enhanced image reproduction.

Figure 7:
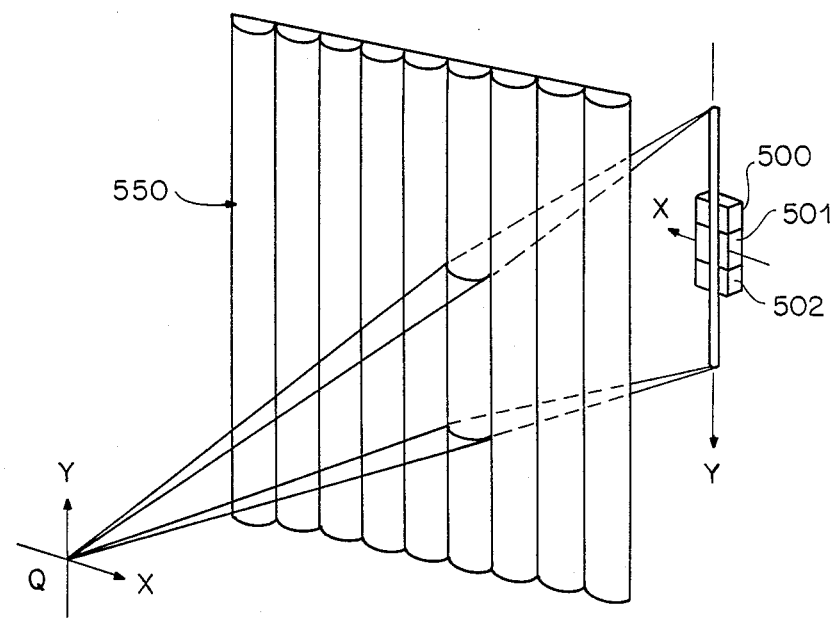
FIG. 7 illustrates an alternative application for the multi-lens sensor of the present invention.

A further alternative use for the multi-lens sensor of the present invention is shown in FIG. 7. In projection television systems that use three separate CRTs to provide the three primary colors (red, blue, and green), there is currently no inexpensive and reliable way of insuring that the three separate images converge on the viewing screen. Thus, convergence must be accomplished manually each time the system is moved or as the previous settings drift due to time and/or temperature variations. A complete convergence of images would require the setting of nine separate parameters, viz., three centers, three rotations, and three frame sizes.

As shown in FIG. 7, a multi-lens sensor is utilized t solve these problems. The sensor device consists of three vertically aligned single element sensors 500, 501, and 502, respectively, e.g., photo-diodes. By the use of filtering, each sensor is sensitive to only one of the three primary colors, red, blue, or green, respectively A cylindrical lens array 550 is placed in front of the sensor plane and serves to focus light in one dimension (in this case the X direction) onto the sensor plane. Each lens thus produces a vertical bar image of a CRT spot Q. Consequently, the device works equally well for all Y positions of a spot light source Q. As the light emitting spot Q moves in the X direction, each of the cylindrical lenses casts a bar image of the spot, in turn, on the sensors 500, 501, and 502. If spot Q is polychromatic, each sensor 500, 501, and 502, is periodically stimulated as light from the series of moving images sweeps by. Thus, the output of sensors 500, 501, and 502, will be a periodic waveform.

If the spot source Q is a union of red, blue, and green contributions from three CRTs in a projection television system, the periodic output from each of the sensors 500, 501, and 502, will be in phase; i.e., the maximum and minimum of all three signals will occur at the same point in time. If the three polychromatic spots are not properly converged, however, the three resulting waveforms will not be in phase, because the three color images will not cross the sensors coincidentally. This difference in the phase of the response of the three sensors 500, 501, and 502, is a measure of the system's lack of convergence. The light intensity at each sensor will be weak, and the resulting periodic waveform will not be of constant amplitude. This makes it difficult to simply compare maximum or minimum values as a measure of convergence. The measurement of phase angle, however, averages the convergence measurement over many cycles, and is therefore inherently more accurate. Thus, the choice of phase as a measure of convergence is advantageous. In addition, phase measurement techniques reduce the effect of background light noise. Specialized phase measurement LSI circuits, e.g., phase locked loops, could easily be utilized in this measurement process.

The above-described convergence phase measurements could be made as a start-up procedure of the projection system, or could take place during viewing by inserting white lines at random as an overlay to the normal viewing material. In order to align the system both vertically and horizontally, the appropriate placement of sensors would be required.

Figure 8:
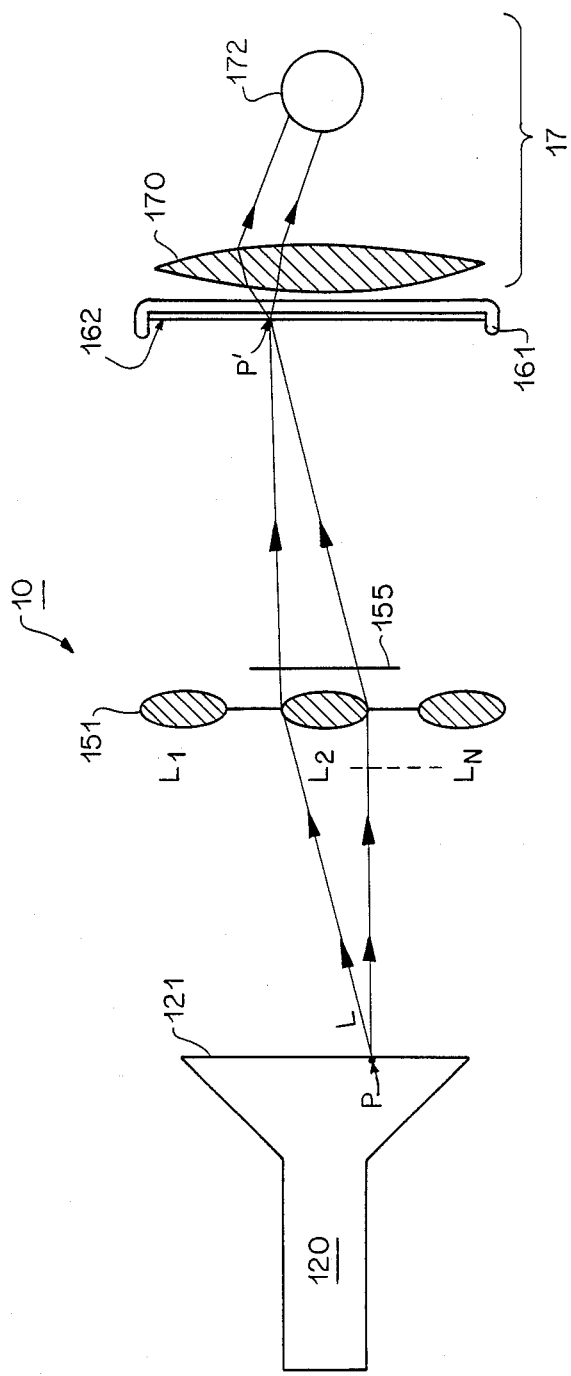
FIG. 8 is a block diagram of the film reading process according to the present invention.

The photographic system of the present invention can also be adapted to add a film reading capability. Film reading is the digitization of the density of a piece of either positive or negative film. Color film is read by digitizing th density of the film with respect to the three primary colors at each point within the film image. The process of digitization usually involves casting a spot of light on a known point of the film and measuring the transmittance of light through the film at that point by placing a light sensor such as a photo-diode or phototube, behind the film plane. The transmittance is defined as the intensity of the transmitted light L divided by the initial light intensity Z. As shown in FIG. 8, reading sensor 17 is positioned behind film plane 162 within the photographic system 10. For this reading process, film holder 161 is transparent. Reading sensor 17 includes collection lens 170 and digitizing photo-sensor 172.

In reading the density of a color print, the CRT beam is located at a known point P on the CRT screen 121 corresponding to a desired point P' on the film plane 162. The beam position (x, y) is accurately determined by the same feedback loop used in the printing process described above. Color filter wheel 155, corresponding to the color being digitized, is placed in the light path before the light reaches either film plane 162 or sensor 172. Next, the beam L is either pulsed or turned on continuously. In either case, a measurement of the initial and transmitted beam intensity Z is made. These measurements are digitized and interpreted to yield a film density. This data is then transferred to a host system or otherwise appropriately stored. The CRT beam L is moved to the next point to be digitized, and the process is repeated, including the insertion of the appropriate color filter in the sequence.

Prior art systems digitized film on a hypothetically orthogonal grid. Due to beam positioning errors, these grids were not in fact orthogonal, but somewhat deformed. Repeated digitization and reconstruction only served to increase the extent of distortion. The system of the present invention is not limited by such constraints. By using the enhanced feedback loop, film can be digitized repeatedly on a exact cartesian coordinate grid.

The ability to read or digitize film has an important impact on the film printer/reader feedback calibration process. Normally, the geometric relationships among the CRT face, the film plane, and the feedback sensor are predetermined and calibrated at the factory. Such calibration information accompanies a film printer system as coefficients stored in permanent memory such as ROM. However, with the present system, the ability to accurately read film also allows user or post-production calibration. In place of film, a specially drawn photo-mask is put into the position of film plane 162 and held in place by holder 161. This photo-mask is essentially a calibration image. The film printer system 10 can then self-calibrate by reading the specially drawn photo-mask, and comparing the results to an accompanying data set of "expected" results from the calibration mode. This comparison then results in a revised calibration mapping algorithm. Thus the system is able to read, modify, and reprint a modified image.

In an alternative embodiment of the film reading mode, the film to be read is independent of the film holder. In this case, a half-silvered mirror would be used to split the light on the film side of the printing lens assembly.

Although the present invention has been described with reference to preferred embodiments, it should be understood by those in the art that various changes or substituted equivalents are within the scope of the invention. It is therefore intended that the invention not be limited to the particular embodiments or applications disclosed herein as the best modes for practicing the invention, but will include all embodiments covered within the scope of the claims.

What is claimed is:

1. An apparatus for reading an image which has been recorded onto a recording medium comprising:

an image source which emits light rays, each of said light rays having a first position with respect to said feedback means coupled to said image source for adjusting each of said light rays to a second position correspondable to a selected position on said recording medium;

transmitting means for selectively transmitting each light ray from said second position onto said recording medium at its corresponding said selection position; and means for reading said image that has been recorded onto said recording medium, said means for reading comprising a light sensor located behind said recording medium, means responsive to said image source and said light source for measuring a first intensity of the light ray as it is emitted from said image source and a second intensity of the light ray after the light ray has been transmitted to said recording medium, thereby measuring a select physical characteristic of the image on the recording medium, and means for digitizing the measured select physical characteristic of the image on the recording medium.

2. A method for reading encoded information which has been recorded on a recording medium comprising the steps of:

emitting light rays from a light source;

transmitting said light rays through a transmission means onto said recording medium;

measuring a first intensity of each of said light rays as it is emitted from said light source;

measuring a second intensity of each of said light rays after said light ray has been transmitted onto said recording medium;

comparing the first intensity with the second intensity thereby measuring a select physical characteristic of said image on said recording medium; and digitizing the select physical characteristic of said image as measured on said recording medium.

3. The method of claim 2 including the additional step of placing color filters between said light source and said recording medium.

4. An apparatus for recording an image onto a light recording medium comprising:

a light source which emits light at a position which is moveable over a surface area of the light source controlled by a controller, the position of the light being subject to deviation from a desired position on the surface of the light source which corresponds to a print position to be printed on the recording medium which has print position coordinates;

a light transmitting device disposed between the light source and the recording medium for selectively transmitting the light from the image source to the recording medium;

a light position sensor having a target area optically coupled to light emitted from any position throughout the surface area of the light source used for recording for detecting the position of the light intersecting the target area of the sensor from the surface of the light source and generating a position signal identifying coordinates of the position of the light within the target area; and wherein the controller, responsive to the position signal, calculates coordinates of the light on the recording medium which are a function of the position signal, compares coordinates of the print position and the calculated coordinates on the recording medium which are a function of the position signal, and modifies the position of the light on the surface area of the light source to cause the light to move to coordinates on the surface area of the light source to cause the light to intersect the recording medium at the print position coordinates.

5. An apparatus in accordance with claim 4 wherein: the light transmitting device comprises an array of lenses and associated shutters which selectively permit passage of light through each individual lense of the array of lenses.

6. An apparatus in accordance with claim 5 wherein: the calculated coordinates are determined from the position signal and the lense of the lense array through which light is to pass for printing on the recording medium which is determined from the print position coordinates.

7. An apparatus in accordance with claim 6 wherein: the calculated coordinates are produced by using a sensor transfer mapping algorithm.

8. An apparatus in accordance with claim 7 wherein: the sensor algorithm utilizes a look-up table.

9. An apparatus in accordance with claim 7 wherein: the sensor algorithm is a function of mathematical calculations and utilizes a look-up table.

10. An apparatus in accordance with claim 7 wherein: the sensor algorithm is based upon geometrical relationships among a plane of the surface area of the light source, a plane of the target area, and a plane of the recording medium.

11. An apparatus in accordance with claim 4 wherein: the light source is a CRT.

12. An apparatus in accordance with claim 4 wherein: the light position sensor is an array of photosensitive elements.

13. An apparatus in accordance with claim 12 wherein: the array is comprised of a charge coupled device.

14. An apparatus in accordance with claim 13 wherein: the array is comprised of photodiodes.

15. An apparatus in accordance with claim 13 wherein: the array is comprised of charge injection devices.

16. An apparatus in accordance with claim 4 wherein: the position of the light is modified by the controller if the print position coordinates differ from the calculated coordinates by an amount greater than a threshold.

17. An apparatus in accordance with claim 16 wherein: the light source is modulated to print pixels on the recording medium with the controller comparing the coordinates of the print position with the calculated coordinates prior to printing each pixel.

18. An apparatus in accordance with claim 16 wherein: the light source is modulated to print pixels on the recording medium with the controller comparing coordinates of the print position of the light with the calculated coordinates prior to printing a group of pixels on an area of the recording medium covering less than a total area of the recording medium to be printed.

19. An apparatus in accordance with claim 4 wherein: the position of the light is not modified by the controller if a difference between coordinates of the print position differ from the calculated coordinates by an amount less than a threshold; and the transmitting device passes the light to the recording medium without modification of position on the surface area of the light source.

20. An apparatus in accordance with claim 5 wherein: the light position sensor is disposed, within an optical path intersecting an optical path of light emitted from the light source, between the light source and the light transmitting device.

21. An apparatus in accordance with claim 20 wherein: a beam splitter is disposed within the optical path of light emitted from the light source and splits light from light emitted from the light source and directs the split light to the light position sensor.

22. An apparatus in accordance with claim 20 wherein: the light position sensor is disposed within an optical path of light reflected from the recording medium.

23. An apparatus in accordance with claim 20 wherein the light position sensor comprises:

a plurality of lenses disposed in an array with each of the lenses of the array being positioned to intercept light emanating from a different section of the surface of the light source; and an array of photosensitive elements optically coupled to the plurality of lenses, each of the plurality of lenses of the array having a focal area which permits the light to fall on all of the photosensitive elements of the target area which may be resolved into coordinates.

24. An apparatus in accordance with claim 22 wherein the light beam position sensor comprises:

a plurality of lenses disposed in an array with each of the lenses of the array being positioned to intercept reflected light emanating from a different section of the surface of the light source; and an array of photosensitive elements optically coupled to the plurality of lenses, each of the plurality of lenses of the array having a focal area which permits the light to fall on all of the photosensitive elements of the target area which may be resolved into coordinates.

25. An apparatus in accordance with claim 23 wherein:
the position of the light is modified by the controller if the print position coordinates differ from the calculated coordinates by an amount greater than a threshold prior to passage of the light through the light transmitting device.

26. An apparatus in accordance with claim 25 wherein:
the light source is modulated to print pixels on the recording medium with the controller comparing the coordinates of the desired position of the light with the calculated coordinates prior to printing each pixel.

27. An apparatus in accordance with claim 25 wherein:
the light source is modulated to print pixels on the recording medium with the controller comparing coordinates of the print position of the light with the calculated coordinates prior to printing a group of pixels on an area of the recording medium covering less than a total area of the recording medium to be printed.

28. An apparatus in accordance with claim 23 wherein:
the position of the light is not modified by the controller if a difference between coordinates of the print position differ from the calculated coordinates by an amount less than a threshold; and
the light transmitting device passes the light to the recording medium without modification of position on the surface area of the light source.

29. An apparatus in accordance with claim 5 wherein:
each shutter is controlled by the controller to selectively open to permit light to pass to the recording medium.

30. An apparatus in accordance with claim 29 further comprising:
a plurality of color filters disposed between the light source and the recording medium, each filter being individually positionable in an optical path of light passing to the recording medium.

31. An apparatus in accordance with claim 4 wherein:
the light position sensor is disposed, within an optical path intersecting an optical pat of light emitted from the light source, between the light source and the light transmitting device.

32. An apparatus in accordance with claim 31 wherein:
a beam splitter is disposed within the optical path of light emitted from the light source and splits light from light emitted from the light source and directs the split light to the light position sensor.

33. An apparatus in accordance with claim 31 wherein:
the light position sensor is disposed within an optical path of light reflected from the recording medium.

34. An apparatus in accordance with claim 31 wherein the light position sensor comprises:
a plurality of lenses disposed in an array with each of the lenses of the array being positioned to intercept light emanating from a different section of the surface of the light source; and
an array of photosensitive elements optically coupled to the plurality of lenses, each of the plurality of lenses of the array having a focal area which permits the light to fall on all of the photosensitive elements of the target area which may be resolved into coordinates.

35. An apparatus in accordance with claim 31 wherein the light beam position sensor comprises:
a plurality of lenses disposed in an array with each of the lenses of the array being positioned to intercept reflected light emanating from a different section of the surface of the light source; and
an array of photosensitive elements optically coupled to the plurality of lenses, each of the plurality of lenses of the array having a focal area which permits the light to fall on all of the photosensitive elements of the target area which may be resolved into coordinates.

36. An apparatus for reading an image which has been recorded on a recording medium comprising:
a light source which emits light at a position which is movable over a surface area of the light source controlled by a controller, the position of the light being subject to deviation from a desired position on the surface of the light source which corresponds to a printed position which has been recorded on the recording medium which has print position coordinates;
a light transmitting device disposed between the light source and the recording medium for selectively transmitting the light from the image source to the recording medium;
a light position sensor having a target area optically coupled to light emitted from any position throughout the surface area of the light source used for reading for detecting the position of the light intersecting the target area of the sensor from the surface of the light source and generating a position signal identifying coordinates of the position of the light within the target area;
the controller, responsive to the position signal, calculates coordinates of the light on the recording medium which are a function of the position signal, compares the print position coordinates of the printed position and the calculated coordinates on the recording medium which are a function of the position signal, and modifies the position of the light on the surface area of the light source to cause the light to move to coordinates on the surface area of the light source to cause the light to intersect the recording medium at the print position coordinates; and
a reading sensor positioned for being optically coupled to light from the light source for sensing light intercepting a recorded medium which is disposed between the light source and the recording sensor.

37. An apparatus in accordance with claim 36 wherein:
the light transmitting device comprises an array of lenses and associated shutters which selectively permit passage of light through each individual lense of the array of lenses.

38. An apparatus in accordance with claim 37 wherein:
the calculated coordinates are determined from the position signal and the lense of the lense array through which light is to pass for reading the recorded recording medium which is determined from the print position coordinates.

39. An apparatus in accordance with claim 38 wherein:
the light position sensor is disposed, within an optical path intersecting an optical path of light emitted from the light source, between the light source and the light transmitting device.

40. An apparatus in accordance with claim 39 wherein:
a beam splitter is disposed within the optical path of light emitted from the light source and splits light from light emitted from the light source and directs the split light to the light position sensor.

41. An apparatus in accordance with claim 39 wherein:
the light position sensor is disposed within an optical path of light reflected from the recorded recording medium.

42. An apparatus in accordance with claim 39 wherein the light position sensor comprises:
a plurality of lenses disposed in an array with each of the lenses of the array being positioned to intercept light emanating from a different section of the surface of the light source; and
an array of photosensitive elements optically coupled to the plurality of lenses, each of the plurality of lenses of the array having a focal area which permits the light to fall on all of the photosensitive elements of the target area which may be resolved into coordinates.

43. An apparatus in accordance with claim 41 wherein the light beam position sensor comprises:
a plurality of lenses disposed in an array with each of the lenses of the array being positioned to intercept reflected light emanating from a different section of the surface of the light source; and
an array of photosensitive elements optically coupled to the plurality of lenses, each of the plurality of lenses of the array having a focal area which permits the light to fall any of the photosensitive elements of the target area which may be resolved into coordinates.

* * * * *